United States Patent [19]

Mingus

[11] 3,920,048

[45] Nov. 18, 1975

[54] RELEASABLE CLOSURE ASSEMBLY INCORPORATING PRESSURE BLEED-OFF

[75] Inventor: Ray E. Mingus, Mission Viejo, Calif.

[73] Assignee: Kaiser Aerospace and Electronics Corporation, Irvine, Calif.

[22] Filed: Feb. 27, 1974

[21] Appl. No.: 446,149

[52] U.S. Cl. .................... 138/89; 138/31; 251/215; 251/218
[51] Int. Cl............................................. F16l 57/00
[58] Field of Search .......... 138/89, 89.1, 89.2, 89.3, 138/89.4, 96 R, 96 T, 31, 40, 44–46; 251/215, 218, 219, 220, 287, 288, 297, 343, 345

[56] References Cited

UNITED STATES PATENTS

| | | | |
|---|---|---|---|
| 611,823 | 10/1898 | Steier | 138/31 |
| 1,580,694 | 4/1926 | Smith | 251/149.4 X |
| 1,614,754 | 1/1927 | Murphy et al. | 138/89 |
| 2,470,256 | 5/1949 | McILroy | 285/314 X |
| 3,434,694 | 3/1969 | Skinner | 251/215 |
| 3,578,285 | 5/1971 | Carlton | 251/218 |

*Primary Examiner*—Henry K. Artis
*Assistant Examiner*—James E. Bryant, III
*Attorney, Agent, or Firm*—Fulwider, Patton, Rieber, Lee & Utecht

[57] ABSTRACT

A releasable closure assembly for connection to a conduit to close the end thereof, which enables pressure which may build up in the conduit to be bled off safely before the end of the conduit is uncovered. A housing, releasably connected to the conduit to close it, has an internal first chamber which communicates with the conduit. A cap threadedly engages the housing adjacent its opposite axial end. Threading and unthreading the cap on the housing slides a plunger connected to the cap along a bore in the housing. First and second passages intersecting the bore at locations spaced by a gap, communicate with the first chamber and with atmosphere, respectively. An annular seal carried by the plunger is positioned in the gap to prevent fluid communication between the chambers via the bore. Partially unthreading the cap moves the seal out of the gap so that air can bleed along the bore from the first chamber to atmosphere, thereby reducing the pressure in the conduit to atmosphere before the housing is released from the conduit.

15 Claims, 5 Drawing Figures

U.S. Patent  Nov. 18, 1975  3,920,048
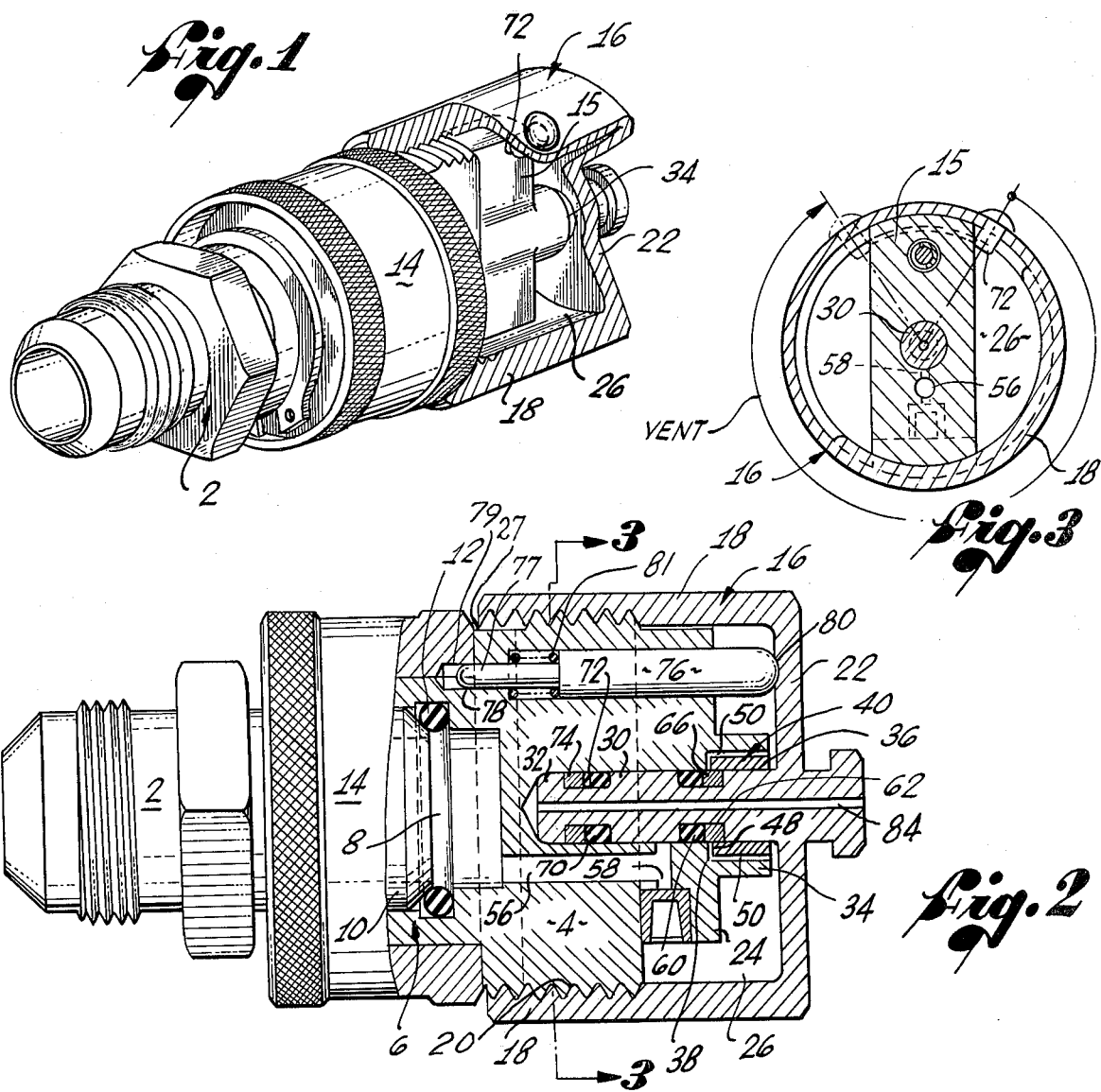
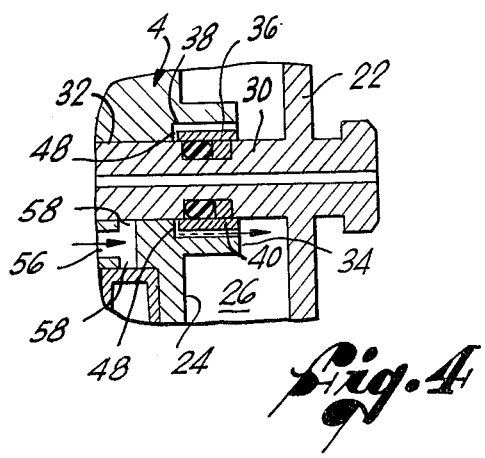

RELEASABLE CLOSURE ASSEMBLY INCORPORATING PRESSURE BLEED-OFF

BACKGROUND OF THE INVENTION

This invention relates to a releasable closure assembly to be applied to the end of a conduit to close the same, wherein the cap enables fluid pressures which may have built up in the conduit to be bled off safely, before the cap assembly is removed from the conduit.

In systems utilizing high pressure gas as a working fluid (e.g., compressed nitrogen), it is sometimes necessary to store the compressed working fluid in a so-called charging bottle which is a metal vessel adapted to withstand high pressure. The fluid is directed into and out of the bottle through a high pressure conduit having a valve interposed in the conduit for opening and closing the conduit for flow. At its other end, the conduit is usually provided with a quick release coupling which enables the conduit to be coupled to a source of high pressure fluid when the bottle is to be charged and which can be coupled to another conduit connected to a utilization system when the stored working fluid is to be utilized.

In such a system, problems can arise if the valve in the conduit suffers from even a slight degree of leakage. Because the charging bottle is required to maintain its store of compressed gas for substantial periods of inactivity without replenishment (e.g., in a submarine at sea), slow leakage through the valve over an extended period of time can significantly reduce the quantity and pressure of stored gas within the charging bottle. To avoid this problem, it has been known to provide a releasable closure assembly on the end of the conduit to prevent fluid escaping from the charging bottle even if there should be a slight leak through the valve in its closed condition. The closure assembly is removed from the conduit when the conduit has to be coupled to a utilization system or to a charging source.

The use of a closure assembly can, however, create a major safety hazard. If there is leakage of compressed fluid past the valve into the conduit, a very substantial pressure can eventually build up behind the closure assembly. Thus, when a person commences to disconnect the closure from the conduit, in order to charge or utilize the bottle, the pressure accumulated behind the closure can cause it to separate from the conduit upon release, with great force and velocity. If this should occur, there is a substantial risk of serious bodily injury. It would therefore be desirable to provide a releasable closure in which pressure built up in the conduit could be bled off before the closure was removed from the end of the conduit.

One prior device disclosed in U.S. Pat. No. 1,580,694, issued to C. T. Smith on Apr. 13, 1926, discloses a pipe coupling having threadedly engaged tubular elements for connecting two fluid lines wherein, on disconnection, the residual pressure in one of the lines is bled off before the couplings are completely unthreaded. The prior device incorporates a packing seal which is moved axially past a bleed hole in the conduit in which pressure is to be relieved, to permit the pressure to bleed to atmosphere as the coupling elements are relatively unthreaded. However, the prior device in the coupled condition does not provide a closure which would prevent fluid from escaping from the one conduit. To the contrary, in the coupled condition, the Smith device is intended to enable flow out of the one conduit into the other conduit.

Moreover, the packing structure utilized in the prior device described might not be suitable for resisting extremely high pressures because, under very high pressures, a resilient deformable packing tends to be extruded into any openings over which it passes by the deformation under the high pressure, and become worn or frayed, a phenomenon known as "nibbling". For these and other reasons, a prior device of the type described, although satisfactory for its intended purposes, might not be suitable for use in closing the end of a conduit connected to a charging bottle used for storing high pressure gas for extended periods of time.

SUMMARY OF THE INVENTION

A releasable closure assembly constructed in accordance with the preferred embodiment of the invention, is intended to obviate or minimize problems of the type previously discussed. The releasable closure is intended for use to provide a leak-proof releasable closure for the end of a conduit connected to a source of fluid under high pressure to prevent escape of fluid from the conduit, and enables high pressure, which may have built up in the conduit, to be bled off before the closure is removed from the conduit. Moreover, the releasable closure accomplishes the foregoing function utilizing a resilient compressible seal, such as an O ring, functioning in a very high pressure environment, without causing the O ring to become nibbled during repeated usage.

In greater detail, the releasable closure assembly includes a housing extending in an axial direction having one axial end adapted for quick release connection to the end of the conduit to seal and close the same. The housing includes an internal first chamber communicating with the interior of the conduit. A cap threadedly engages an opposite axial end of the housing and defines a second chamber between the cap and the housing which communicates with atmosphere. The cap includes a plunger which extends axially into a bore in the housing. First and second passages intersect the bore at first and second locations, spaced axially by a gap, and separately connect the bore to the first and second chambers, respectively. An annular resilient, compressible seal carried by the plunger extends into continuous peripheral sealing contact with the bore in the gap between the first and second passages, thereby preventing flow from the first chamber to the second via the bore. By unthreading the cap on the housing, the plunger is moved axially to slide the seal beyond the gap, thereby enabling fluid to flow from the first chamber, through the first passage, the bore and the second passage to the second chamber and thence to atmosphere. In that way any high pressure which may have built up in the conduit can be bled off safely. During the bleeding-off period, the hiss of escaping fluid provides an audible warning that it is not yet safe to detach the releasable closure from the end of the conduit. After the hissing ceases, the pressure in the conduit has been reduced to ambient pressure, and the housing may be uncoupled from the end of the conduit.

The resilient seal comprises an O ring which is carried by the plunger past the second location at which the second passage communicates with the bore. Under very high pressures, an O ring passing over a port can tend to be extruded into the port and sheared, thereby nibbling or fraying the O ring in repeated use with a consequent loss of its sealing properties. To avoid such nibbling, the second passage comprises a plurality of narrow gauge, radial bores or channels in the housing spaced around and intersecting the bore. Each of the radial channels has a diameter substantially less than the thickness of the O ring. As a result, the ability of the O ring to enter the channels is substantially eliminated and nibbling or fraying of the O ring is greatly minimized.

The foregoing, and other advantages of the invention, are discussed more fully in the detailed description hereinafter.

BRIEF DESCRIPTION OF THE DRAWINGS

A releasable closure assembly, in accordance with the invention, is illustrated in the accompanying drawings in which:

FIG. 1 is a perspective view, partially in cross-section, showing a releasable closure assembly constructed in accordance with the preferred embodiment of the invention, coupled to a fitting, the fitting being adapted for permanent connection to the end of a conduit in which pressure may build up in excess of atmospheric pressure;

FIG. 2 is a cross-sectional side view of the releasable closure assembly shown in FIG. 1 with the parts thereof shown in a closed or sealed position;

FIG. 3 is a cross-sectional end view of the releasable closure assembly shown in FIG. 2 taken along the lines 3—3 therein;

FIG. 4 is a cross-sectional side view of an enlarged scale of a portion of the releasable closure shown in FIG. 2 but with certain parts thereof shifted to a bleed position in which the pressure in the conduit is bled off to atmosphere; and FIG. 5 is a perspective view on an enlarged scale of a sleeve forming a part of the releasable closure assembly shown in FIG. 2.

DETAILED DESCRIPTION

Referring to FIG. 1 of the drawings, a releasable closure assembly according to the preferred embodiment of the invention is there shown. The closure assembly is shown coupled to a fitting 2. The fitting 2 is adapted for permanent threaded connection to a conduit (not shown). The conduit extends via a shutoff valve to a source of compressed gas at high pressure (also not shown). It will be assumed for the purpose of subsequent discussion that the valve is subject to slight leakage leading to a gradual build up of pressure in the conduit between the shutoff valve and the closure assembly as time passes. An example of an environment in which the invention might be utilized would be to close the end of a conduit connected to a charging bottle for storing compressed gas on a submarine, wherein the closure assembly would prevent escape of pressurized gas from the bottle even though the shut-off valve was subject to slight leakage.

The releasable closure assembly (FIG. 2) includes a cylindrical housing 4. At one end of the housing 4 is a rearwardly extending, tubular portion 6 of the housing which defines a rearwardly open first chamber 8 having a closed forward end. A male coupling member 10 at the forward end of the fitting 2 is slidably received within the portion 6 of the housing and seats in sealing relation against an O ring 12 mounted in the housing at the forward end of the first chamber 8.

The male coupling 10 on the conduit is held in sealing engagement with the housing of the releasable closure by coupling structure which includes a collar 14 mounted about the portion 6 of the housing for limited rotational motion on it. In a locked position of rotation relative to the housing, the male coupling member 10 is locked in engagement with the housing 4 while in another, released rotational position of the collar 14 the male coupling 10 is released from the housing. In the preferred embodiment, the releasable coupling structure and the fitting 2 comprise a quick action coupling as disclosed in U.S. Pat. No. 2,470,256, issued May 17, 1949 to Harold McIlroy for "Quick-Action Coupling" relevant portions of the disclosure of which are incorporated herein by reference.

Integral with the forward end of the housing 4 is an axially extending, generally rectangular, projecting wall 15 positioned symmetrically on a diameter of the housing 4 and having threaded, curved side surfaces on which an internally threaded cap 16 is mounted. The cap extends forwardly to enclose the forward axial end of the housing. The cap includes a cylindrical sidewall 18 which is internally threaded to engage the correspondingly threaded side surface of the forward wall 15. A radially extending, end wall 22 at the forward end of the cap 16 is spaced from a forward radial end face 24 at the forward axial end of the wall 15. The enclosed space between the cylindrical portion 4 of the housing and the end wall 22 of the cap on opposite sides of the wall 15 constitutes a second chamber 26 which communicates with atmosphere through the open rear end 27 of the cap.

The end wall 22 of the cap supports a concentric, rearwardly extending plunger 30 which extends slidably into an aligned axial bore 32 in the housing having a closed rearward end. Extending around the bore 32 at its forward end and projecting into the second chamber 26 is an annular projection 34. The projection 34 has an open ended cylindrical recess 36, concentric with the bore 32, which extends into the housing from the open end of the projection 34 a short distance beyond the radial end face 24 and terminates in a radial internal shoulder 38.

Press-fitted into the recess 36 is an annular sleeve 40 (FIG. 5) which is axially coextensive with the recess. The sleeve 40 has a central bore 42, of the same diameter and concentric with the bore 32, through which the plunger 30 passes in sliding relation. The sleeve includes a radial end face 44, which abuts the shoulder 38 in the recess in face to face relation, and a cylindrical side surface 46 in abutting relation with the side surfaces of the recess 36. A plurality of equally spaced radial grooves 48 are formed in the radial end face 44 of the sleeve and cooperate with the shoulder 38 to define a plurality of radial channels intersecting the bore. The sleeve 40 is also grooved along its peripheral side surface 46 with a plurality of axial grooves 50 each of which extends from one of the radial grooves 48 to place the latter in fluid communication with the second chamber 26.

Although not apparent from the drawings, it should be appreciated that there is sufficient clearance between the external surface of the plunger 30 and the walls of the bores 32 and 42 for fluid to flow between the plunger and the bores. Thus, the radial channels and the axial channels place the bore in fluid communication with the second chamber. The bore is also in communication with the first chamber 8 which is subjected to the pressure within the conduit. Such communication is effected by an axially extending passage 56 extending through the housing 4 from the first chamber and having a closed forward end. A radial passage 58 intersecting the axial passage 56 extends into the bore 32 at a location spaced by an axial gap from the location at which the radial channels 48 intersect the bore.

In a closed or sealed position of the cap 16 on the housing 4, shown in FIG. 2, fluid communication along the bore between the passage 58 and the channels 48 is prevented by a resilient O ring seal 60. The O ring seal 60 is made from a resilient elastomeric material such as neoprene or the like and is of circular configuration, also having a circular cross section. The seal 60 is mounted in an annular groove 62 extending around the plunger, which also accommodates a backup ring 66 made of teflon or other suitable material to assist in supporting the O ring. When the cap 16 is in its closed condition, the O ring 60 is positioned in the gap between the locations at which the passages 58 and the channels 48 intersect the bore and prevents flow of fluid across the O ring so that the conduit remains fully sealed.

When it is desired to uncover the end of the conduit 2, to enable it to be connected to a utilization device or for recharging, it is necessary to remove the entire closure assembly, comprising the housing 4 and portion 14 of the coupling structure from the conduit. To do so at a time when a residual high pressure still existed in the conduit, due to prior accumulated leakage over an extended period of time, would pose a serious safety hazard. It is therefore necessary to bleed off the residual pressure in the conduit before the entire closure assembly is removed.

To bleed off the pressure, an operator unthreads the cap 16 approximately one turn on the housing 4, thereby moving the plunger a sufficient distance outwardly along the bore 32 to move the O ring 60 beyond the gap between the radial passage 58 and the radial channels 48 (FIG. 4). As a result, fluid can flow from the interior of the conduit through the first chamber 8, the passage 56, then the passage 58, along the bore 32 between the bore and the plunger, through the radial channels 44 and the axial channels 50, into the second chamber 26. From the second chamber 26 the fluid is free to escape between the open end 27 of the cap and the rest of the housing. As the high pressure fluid commences to bleed to atmosphere through this path, it will cause a hissing sound which will continue until the pressure within the conduit has been bled substantially to atmospheric pressure. After the hissing has ceased, the operator releases the quick release coupling structure by turning the collar 14 on the housing, through less than a revolution, to separate the closure assembly entirely from the fitting 2 on the conduit.

It will be appreciated that with the structure described, the hazard of removing the closure from a conduit in which there is a substantial internal pressure is avoided by enabling the pressure within the conduit to be bled off before the closure is released. Because the radial grooves 48 have a very small collective cross-sectional area in relation to the cross-sectional area of the conduit they have a high fluid impedance. The impedance causes a substantial presssure drop in the escaping fluid which enters the cap at a sufficiently low rate and pressure not to present any risk of stripping the cap from the housing. In addition, the direction of the escaping fluid through the open end of the cap 16 insures that the escaping fluid flows away from the workman standing in front of the cap. In the preferred embodiment the interengaging threaded portions on the cap and the housing comprise a double start thread. The use of a double start thread allows sufficient axial movement of the seal to clear the gap on a single turn of the cap while reducing the thread loading to a sufficiently low level to avoid the possibility of stripping the threads as the high pressure fluid enters the second chamber.

At the extremely high pressures at which the closure assembly of the invention may customarily be used, resilient O rings can easily become extruded into any ports which they are required to pass over. To avoid this problem, the channels 48 each have a cross-sectional opening which is much smaller than the thicknesses of the O ring 60. As a result, the opportunity for the O ring to become extruded into the channels is substantially eliminated and nibbling of the O ring whereby it might become frayed after repeated passage across the channels 48 is substantially avoided.

Mounted on the plunger, spaced on the opposite side of the passage 58 from the O ring 60, is another O ring seal 70 also mounted in an annular groove 72 in the plunger and provided with a teflon backup ring 74. The second O ring 70 prevents passage of high pressure fluid past the O ring into the closed end of the bore 32 where it could otherwise exert a powerful outward force on the plunger. In addition, the pressure force acting on the O ring 70 is equal and opposite to the pressure force acting on the first O ring 60 and balances it out so that the plunger is pressure balanced. As a result there is no binding force on the threads 20 due to unbalanced pressure forces acting on the plunger 30.

After recoupling the closure assembly to the conduit 2, it is necessary to turn the cap 16 one revolution in a threading direction relative to the housing 4 to return the seal 60 to the gap in the bore between the passage 58 and the channels 44, to return to the sealed condition. The range of angular motion of the cap 16 on the housing 4 is somewhat less than a complete revolution because between each of the extreme positions, locked and released, further revolution of the cap is prevented by impingement of a radial pin 72 projecting inwardly from the skirt 18, against either opposite face of the wall 15. Because of the provision of the pin 72, which acts as a stop, the mechanic cannot overtighten the cap on the threads at either extreme of its rotational movement. As can be seen from FIG. 3, the range of rotational movement of the cap 16 is approximately one revolution, but reduced to somewhat less because of the thickness of the wall 15.

Because the closure assembly may sometimes be positioned in an environment where it is subjected to vibration, provision is made for preventing the cap 16 from turning from the closed to the open position under the influence of vibration. For that purpose a spring-loaded detent 76 is mounted for axial movement in a closed ended bore 78 in the housing and projects into the second chamber. At its free forward end, the detent 76 is rounded and engages a correspondingly rounded dimple 80 on the inner surface of the radial end wall 22 of the cap. The spring force is sufficient to prevent the cap 16 turning relative to the housing under the influence of vibration alone. It requires the positive turning force exerted by an operator to unseat the detent 76 and permit the cap to turn from the closed condition.

Another important function of the detent pin 76 is to act as an interlock to the releasable coupling collar 14 by preventing it from being turned to release the closure assembly from the fitting 2 until the cap 16 has first been turned to the release position to bleed off the pressure in the conduit. At its rear end the detent 76 includes an integral, rearwardly projecting pin 77 of reduced diameter which extends slidably through a bore 78 in the housing into a hemispherical demi bore 79 in the collar 14. When the collar 14 is in the locked position in which the housing 4 is coupled to the fitting 2, the bores 78 and 79 are aligned. Movement of the cap 16 to the closed position on the housing 4 slides the pin 77 into the bore 79 so that the collar 14 cannot be rotated to the release position to separate the closure assembly from the fitting on the end of the conduit. Axially outward movement of the cap when it is rotated to the bleed off position enables the pin 77 to be withdrawn from the bore 79 by a spring 81 so that the collar 14 is freed for subsequent turning to the released position.

To prevent air from becoming trapped between the closed end of the bore 32 and the plunger when the cap is assembled onto the housing, an axial air vent passage 84 extends centrally the full length of the plunger 30.

Summarizing, it will be appreciated that a releasable closure according to the invention contributes significantly to safety when applied as a closure to the end of a conduit in which high pressure may build up due to leakages, by enabling the pressure to be bled off without danger before the closure assembly is removed. In addition, the use of a plurality of narrow radial channels, each having an opening substantially smaller than the thickness of the O ring, prevents nibbling of the O ring so that its sealing qualities are not impaired despite repeated usage.

Although the invention has been described with reference to one preferred embodiment, it will be appreciated that many changes, alterations, modifications and other variations may be made within the spirit of the invention as disclosed herein.

I claim:

1. A releasable closure assembly for closing an end of a conduit, having a hollow interior, in which fluid pressure greater than atmosphere may build up, which enables the pressure in the conduit to be bled off before the end of the conduit is uncovered, the closure assembly comprising:
   a housing extending in an axial direction, said housing having one axial end adapted for releasable connection to the conduit to close the end thereof, said housing having,
     an internal first chamber which communicates with the interior of the conduit when the housing is connected thereto;
   a cap mounted on said housing adjacent an opposite axial end thereof for selective movement relative to said housing in opposite axial directions, portions of said cap being spaced from adjacent portions of said housing to define a second chamber;
   at least one of said cap and said housing having,
     an opening therein extending between said second chamber and the atmosphere;
   an axially extending bore in said housing,
   a plunger operatively connected with said cap extending into said bore for motion therealong in opposite axial directions when said cap is moved in the opposite direction relative to said housing;
   first and second passage means in said housing intersecting said bore at first and second locations spaced axially apart to define a gap therebetween, for separately placing said bore in fluid communication with said first and second chambers, respectively; and
   seal means carried by said plunger for providing a continuous peripheral seal between said plunger and said bore, said seal means being positioned in the gap between said first and second locations thereby preventing fluid flow between said chambers via said bore when said cap is positioned in one axial position relative to said housing, said seal means being carried along said bore by said plunger beyond the gap between said first and second locations when said cap is moved to another axial position thereof relative to said housing thereby placing said first and second chambers in fluid communication to enable the built-up fluid pressure in the conduit to bleed to atmosphere before said housing is released from the conduit.

2. A releasable closure assembly as defined in claim 1, wherein said seal means includes:
   a resilient compressible O ring partially received within a mounting groove extending peripherally around said plunger, said O ring having a generally uniform thickness extending peripherally into continuous, sealing sliding contact with said bore;
   and wherein said second passage means includes,
   a plurality of radial channels in said housing, each said channel having radial inner and outer ends, said radial channels at their radially inner ends intersecting said bore; and
   axial channel means in said housing for placing the radially outer ends of said radial channels in communication with said second chamber.

3. A releasable closure assembly as defined in claim 2, wherein each of said radial channels has a substantially smaller diameter than the thickness of said O ring whereby any tendency of said O ring to extrude into said radial channels as it passes over them is substantially minimized.

4. A releasable closure assembly as defined in claim 1 wherein said cap and said housing are connected together by interengaging threaded portions, relative threading and unthreading movement of said cap relative to said housing causing the axial movement of said cap.

5. A releasable closure assembly as defined in claim 2, wherein said housing includes:
   a cylindrical recess extending between said second chamber and said bore concentric therewith, said recess being of enlarged diameter relative to said bore,
   a radial shoulder extending between said bore and said recess at their junction;
   a sleeve mounted within said recess slidably receiving said plunger, said sleeve having,
     a radial face in abutting contact with said radial shoulder of said recess; and
     a plurality of radially extending grooves in said radial face, said grooves and said shoulder of said recess cooperating to define said radial channels.

6. A releasable closure assembly as defined in claim 5, wherein said sleeve includes an axially and peripherally extending side surface in continuous abutting contact with adjacent portions of said housing defining said recess, and wherein said axial passage means includes a plurality of axially extending grooves in the side surface of said sleeve, each of said axial grooves extending from an associated one of said radial grooves into communication with said second chamber.

7. A releasable closure assembly as defined in claim 4, wherein said interengaging threaded portions comprise a double start thread having a sufficient pitch to move the cap between said one position and said another position thereof in a single revolution of said cap relative to said housing while enabling a sufficiently low thread loading to prevent the pressure force exerted on said cap from stripping the thread when the pressure fluid is admitted into said second chamber.

8. A releasable closure assembly as defined in claim 4, wherein said interengaging threaded portions extend for a sufficient axial distance to provide sufficient threaded engagement between said cap and said housing after said cap has been moved to said another position to retain said cap on said housing against the pressure force exerted thereon by the pressure fluid admitted to said second chamber.

9. A releasable closure assembly as defined in claim 1, wherein at least one of said first and second passage means has a sufficiently high fluid impedance to insure that the pressure and quantity of fluid bled into said second chamber is not sufficient to strip said cap from said housing.

10. A releasable closure assembly as defined in claim 1, further including:
a collar mounted on said housing for limited rotational motion relative thereto between a release position and a locked position,
a fitting adapted for permanent connection to the one end of the conduit,
engaging means carried by said housing responsive to the positioning of said collar for fixedly engaging said housing with said fitting when said collar is in the locked position and for permitting said housing to be detached from said fitting when said collar is in the release position; and
detent means carried by said housing in contact with said cap for preventing rotational motion of said collar from the locked position to the release position when said cap is in said one axial position relative to said housing; whereby said housing can not be removed from said fitting until said cap has first been moved to said another axial position thereof to bleed off the pressure within the conduit.

11. A releasable closure assembly as defined in claim 1, further including:
spring-loaded detent means extending between said housing and said cap for yieldably resisting movement of said cap relative to said housing.

12. A releasable closure assembly as defined in claim 1, further including:
second seal means carried by said plunger for providing a continuous peripheral seal between said plunger and said bore, said second seal means being positioned on an opposite side of said firsst passage means from said seal means, said second seal means and said seal means exposing substantially equal cross-sectional areas to the fluid pressure in the bore between said seal means and said second seal means whereby the pressure forces exerted on said plunger when said cap is positioned in said one axial position are balanced out.

13. A releasable closure assembly as defined in claim 1, wherein said bore includes an open end receiving said plunger and a closed end remote from said open end, the releasable cap assembly further including:
second seal means carried by said plunger for providing a continuous peripheral seal between said plunger and said bore, said second seal means being positioned on an opposite side of said first passage means from said seal means for preventing passage of the fluid under pressure into the closed end of said bore.

14. A releasable closure assembly as defined in claim 13, wherein said plunger includes a central axial passage extending from atmosphere to the closed end of said bore to permit trapped air to escape as said plunger is moved axially into said bore.

15. A releasable closure assembly as defined in claim 1 further including:
a stop member carried by said cap, said stop member contacting portions of said housing at opposite extremes of travel of said cap between said one position and said another position relative to said housing to limit said cap to a rotational range of motion of approximately one revolution.

* * * * *